United States Patent [19]
Fukumura

[11] Patent Number: 5,607,241
[45] Date of Patent: Mar. 4, 1997

[54] WHEEL BEARING ASEMBLY

[75] Inventor: Yoshikazu Fukumura, Iwata, Japan

[73] Assignee: NTN Corporation, Osaka, Japan

[21] Appl. No.: 455,554

[22] Filed: May 31, 1995

[30] Foreign Application Priority Data

May 31, 1994 [JP] Japan .................................. 6-118775

[51] Int. Cl.[6] ............................................ F16C 25/08
[52] U.S. Cl. ................................. 384/537; 384/544
[58] Field of Search ................................ 384/544, 537, 384/543, 497, 496, 512

[56] References Cited

U.S. PATENT DOCUMENTS 4,427,085  1/1984  Aucktor ................................. 384/544
4,798,560  1/1989  Farrell .................................. 384/544
4,804,233  2/1989  Hofmann et al. ..................... 384/544
4,835,829  6/1989  Welschof et al. ..................... 384/544

*Primary Examiner*—Lenard A. Footland
*Attorney, Agent, or Firm*—Wenderoth, Lind & Ponack

[57] ABSTRACT

A wheel bearing assembly can be assembled easily while maintaining a high reliability of connection between the outer ring and the hub. A hub is fitted into or onto a shaft portion of an outer ring of a homokinetic joint. Ball raceways are formed on the outer ring and the hub at their opposite ends. Balls are arranged in two rows so as to roll along the respective raceways. A bearing outer ring around the outer ring and the hub is supported by the balls. The shaft portion of the outer ring and the hub are press-fitted together with a predetermined interference. They are welded together at one end of their joint area.

4 Claims, 4 Drawing Sheets

WHEEL BEARING ASEMBLY

BACKGROUND OF THE INVENTION

This invention relates to a wheel bearing assembly for supporting a driven wheel of an automobile.

FIG. 7 shows a conventional wheel bearing assembly of this type. This bearing assembly comprises a homokinetic joint having an outer ring 30, a hub 32 integrally formed on the outer end of the outer ring 30 and having a flange 31 for supporting a driven wheel, and a bearing outer ring 34 mounted around the outer ring 30 through a plurality of rows of balls 33 and secured to the vehicle body.

When assembling this bearing assembly, the bearing outer ring 34 is slid onto the hub-carrying outer ring 30 from its end. This means that the inner diameter of the bearing outer ring 34 has to be larger than the outer diameter of the outer ring 30.

Thus, conventional bearing assemblies of this type were all very large and heavy. It is not desirable to mount such a large and heavy assembly on an automobile, which is required to be as lightweight as possible.

Also, the outer ring 30 has to have a sufficiently large outer diameter at its portion supporting the bearing outer ring 34, so that it tends to be rather heavy. Such a heavy outer ring 30 tends to produce such a large inertia moment while the vehicle wheels are rotating that the steerability of the vehicle deteriorates markedly.

Unexamined Japanese Patent Publication 63-106426 proposes a solution to this problem. As shown in FIG. 8, the wheel bearing assembly disclosed in this publication has a hub 41 having its end butted and welded at 44 to one end of the outer ring 40 of the joint. Around the hub 41, a bearing outer ring 43 is supported through balls 42 arranged in two rows.

When assembling this bearing assembly, the bearing outer ring 43 is fitted on-the hub 41 before joining the hub to the outer ring 40 of the joint. This arrangement makes it possible to reduce the diameters of the bearing outer ring and the hub. It is thus possible to reduce the size and weight of the entire wheel bearing assembly.

But the wheel bearing assembly shown in FIG. 8 has one problem. Namely, when torque is transmitted between the outer ring 40 of the joint and the hub 41, an extremely large load acts on the weld portion 44. Thus, the weld portion 44 has to be strong enough to withstand such a large load. In order to weld the hub to the outer ring of the joint with sufficient strength, they have to be welded together over their entire contact surface by friction welding or by any other welding method which tends to heat the joint surface to extremely high temperatures. If the joint surface is heated excessively, the outer ring 40, hub 41, balls 42 and bearing outer ring 43 will also be heated excessively, to such an extent that they are annealed. As a result, their hardness and strength drops markedly. Also, by being heated, their dimensions may change due to thermal strain.

It is usually necessary to pressurize the balls 42 of such a wheel bearing assembly to keep the bearing portion rattle-free. The wheel bearing assembly shown in FIG. 8 has a problem in this regard, too, because it is impossible to apply a predetermined pressure to the balls 42 with high precision.

A wheel bearing assembly described in Unexamined Japanese Utility Model Publication 3-75003 has a hub fitted on and joined by bolts or nuts to a shaft portion of the outer ring of the joint. When tightening the bolts or nuts, the balls are pre-loaded because the hub and the outer ring are moved axially relative to each other.

But the bolts or nuts may loosen due to vibration while in use. Thus, the outer ring and the hub cannot be joined together reliably.

An object of this invention is to provide a small, compact wheel bearing assembly which can be assembled easily while keeping a high reliability of the connection between the joint outer ring and the hub.

SUMMARY OF THE INVENTION

According to this invention, there is provided a vehicle wheel bearing assembly comprising an outer ring of a homokinetic joint, a hub coupled to a driven wheel and connected to one end of the outer ring to form a rotary member, and a bearing outer ring supported on the rotary member through balls arranged in a plurality of rows. The balls are pre-loaded when the outer ring and the hub are moved axially relative to each other, the outer ring and the hub being press-fitted together with an interference. The outer ring and the hub are welded together at one end of the joint area.

Serrations are preferably formed on the joint surfaces of the outer ring and the hub so as to be press-fitted together.

Further, a retaining ring is preferably provided between the joint surfaces of the outer ring and the hub.

Since pressure is applied to the balls by press-fitting the joint outer ring and the hub together, the balls remain pre-loaded even after removing the press-fitting force.

Thus, the outer ring and the hub can be welded together at one end of their joint area with no press-fitting force applied thereto.

Since the outer ring and the hub are fastened to each other by welding, they are reliably joined together.

By providing a retaining ring between the joint surfaces of the outer ring and the hub, it is possible to prevent the outer ring and the hub from moving axially relative to each other even if the weld portion is broken due, e.g., to vibration.

BRIEF DESCRIPTION OF THE DRAWINGS

Other features and objects of the present invention will becomes apparent from the following description made with reference to the accompanying drawings, in which.

DETAILED DESCRIPTION OF THE PREFERRED EMBODIMENT

Reference is now made to FIGS. 1–6, which show the embodiments of the present invention.

Figure 1:
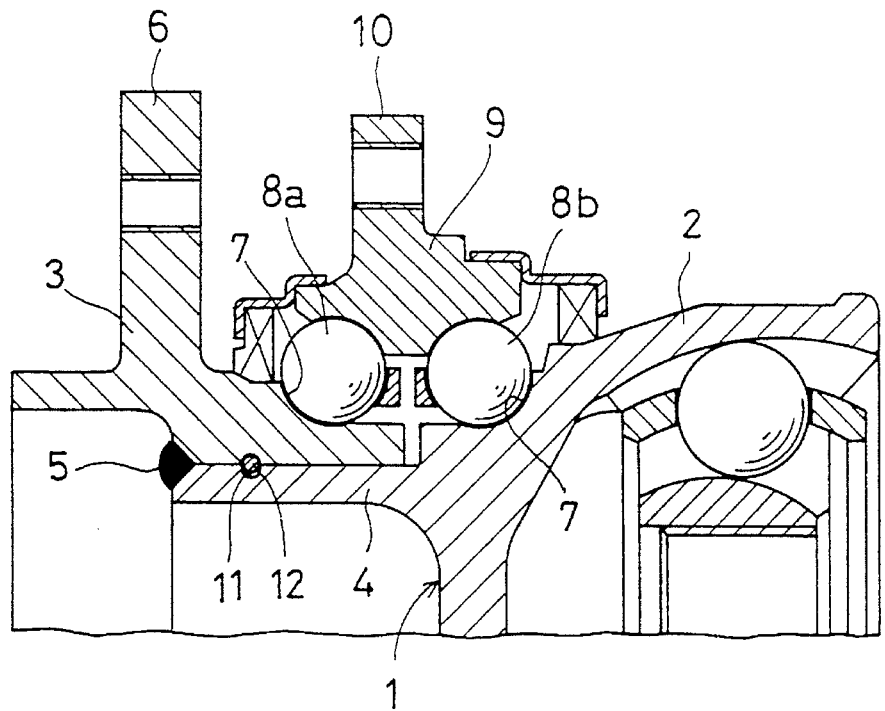
FIG. 1 is a sectional view of one embodiment of the wheel bearing assembly according to this invention.

FIG. 1 shows the first embodiment of the wheel bearing assembly according to this invention. As shown, its rotating member 1 is made up of an outer ring 2 of a homokinetic joint and a hub 3 connected to one end of the outer ring 2.

The outer ring 2 has a cylindrical shaft portion 4 on which the hub 3 is press-fitted.

If the interference at the joint portion between the hub 3 and the shaft portion 4 is too small, the coupling force will be weak. But if it is too large, it will be difficult to press-fit the hub onto the shaft portion. Such interference should preferably be within the range of 10–150 μm. Within this range, the press-fitting force between the hub 3 and the shaft portion 4 will be 100–2000 kgf.

The shaft portion 4 and the hub 3 are welded together at one end of their joint area. Numeral 5 indicates such a welding point. Preferably, they are welded together by spot welding, laser welding, electron beam welding or any other welding method that produces less heat.

The hub 3 has a flange 6 for mounting the wheel. Ball raceways 7 are formed on the outer surfaces of the hub 3 and the outer ring 2 of the joint at their opposite ends. A bearing outer ring 9 is supported by balls 8a and 8b, adapted to roll in the ball raceways 7 in two rows.

The bearing outer ring 9 has a flange 10 to be secured to the vehicle body. It is fitted onto either the shaft portion 4 of the outer ring 2 or the hub 3 before connecting the hub 3 with the outer ring 2 of the joint. Thus, the inner diameter of the bearing outer ring 9 and the outer diameter of the supporting portion of the rotary member 1 supporting the bearing outer ring 9 may be smaller than the outer diameter of the outer ring 2 of the joint. It is therefore possible to reduce the size and weight of the entire wheel bearing assembly.

As explained above, the outer ring 2 and the hub 3 can be joined together extremely firmly by press-fitting the hub 3 onto the shaft portion 4 of the outer ring 2 and welding the hub 3 and the shaft portion 4 together at one end of their joint area.

Also, by press-fitting the hub 3, the balls 8a and 8b are pre-loaded. Even after removing the press-fitting force, the balls 8a, 8b remain pre-loaded because the hub 3 is press-fitted on the shaft portion 4 with an interference fit. Thus, the balls will act on the hub 3 and the shaft portion 4 to prevent them from moving away from each other.

Since the shaft portion 4 and the hub 3 are kept pressed against each other, there is no need to apply any external force to press them against each other when welding them together. Thus, they can be easily welded together. Since torque is transmitted between the outer ring 2 and the hub 3 mainly through their press-fitted surfaces, the weld portion 5 is subjected to no big load. Thus, it is possible to adopt a welding method which produces less heat.

As shown in FIG. 1, a shrinkable retaining ring 12 may be fitted in ring grooves 11 formed opposite to each other in the joint surfaces of the shaft portion 4 and the hub 3. The ring 12 will serve to prevent axial movement of the shaft portion 4 and the hub 3 relative to each other even if the weld portion 5 should break. Thus, they can be joined together more reliably.

FIGS. 2–6 show wheel bearing assemblies of other embodiments according to this invention.

Figure 2:
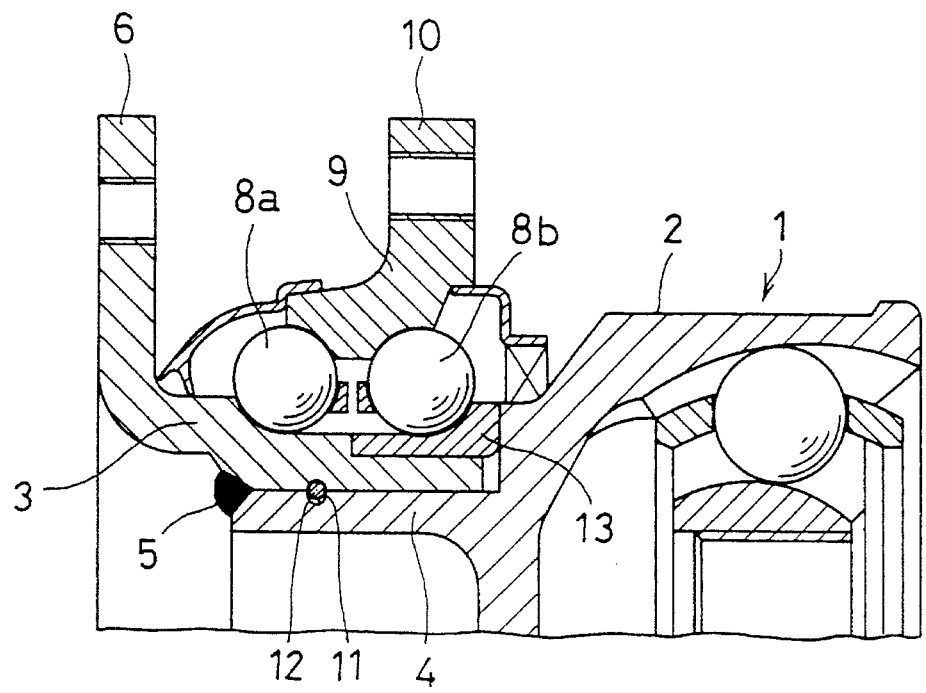
FIGS. 2 to 6 are sectional views of other embodiments of the wheel bearing assembly.

In the embodiment shown in FIG. 2, the hub 3 is formed by pressing. A bearing inner ring 13 is fitted on one end of the hub 3 to rollably support one of two rows of balls 8a and 8b. Otherwise, this embodiment is the same as the first embodiment. Thus, like elements are denoted by like numerals and their description is omitted.

Figure 3:
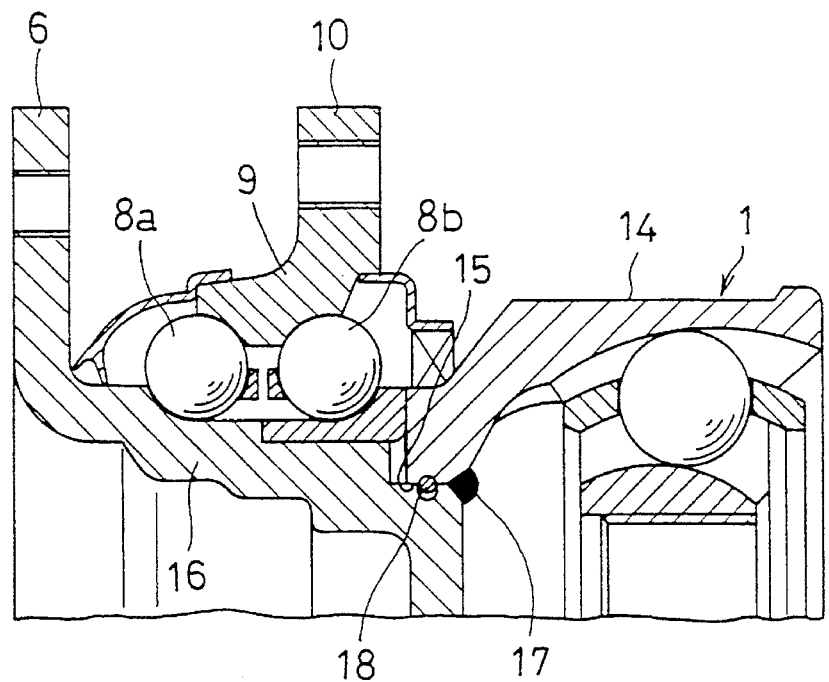

In the embodiment shown in FIG. 3, a hub receiving hole 15 is formed in one end of the outer ring 14 of the joint. A hub 16 formed by pressing has its end press-fitted in the hole 15. The hub 16 and the outer ring 14 are welded together at one end of their joint area. Numeral 17 indicates the weld portion.

A retaining ring 18 is disposed at the joint area between the outer ring 14 and the hub 16 to prevent relative axial movement of the hub 16 and the outer ring 14.

Otherwise, this embodiment is the same as the second embodiment. Thus, like elements are denoted by like numerals and their description is omitted.

The outer ring 14 of the joint shown in FIG. 3 is lighter in weight than the outer ring 2 having the shaft portion 4 as shown in FIG. 2.

Figure 4:
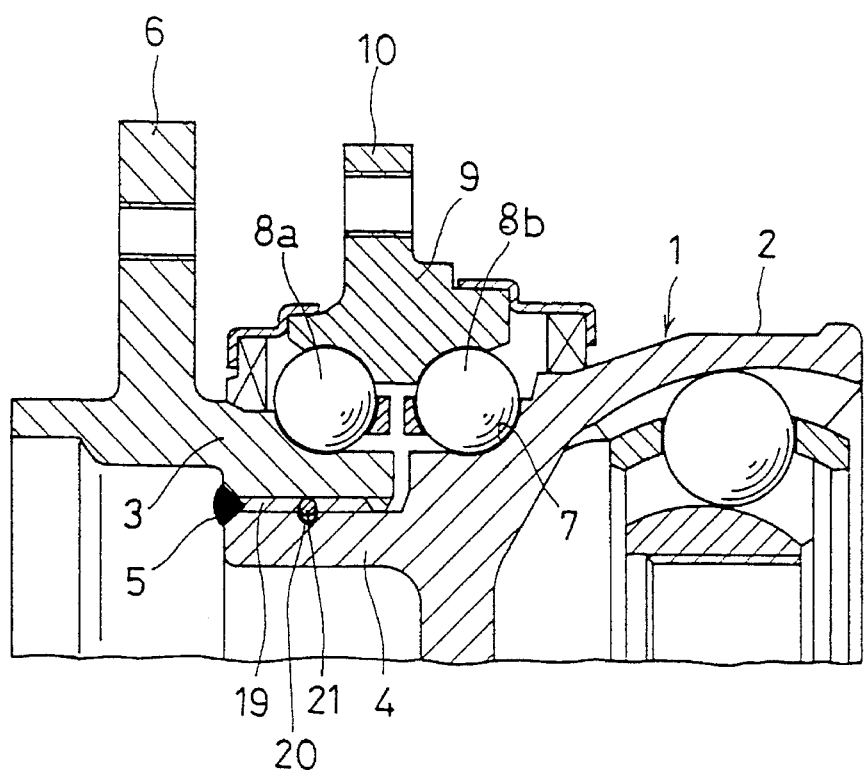

In the embodiment shown in FIG. 4, serrations 19 are formed on the joint surfaces of the shaft portion 4 of the outer ring 2 and the hub 3. Serrations 19 mesh with each other with an interference of 10–50 μm, so that the balls 8a and 8b will be kept pre-loaded.

A shrinkable retaining ring 21 is fitted in ring grooves 20 formed in the serrations 19.

Otherwise, this embodiment is the same as the embodiment shown in FIG. 1. Thus, like elements are denoted by like numerals and their description is omitted.

In the arrangement of FIG. 4, torque is transmitted from the outer ring 2 to the hub 3 through the serrations 19. Thus, torque can be transmitted reliably between the outer ring 2 and the hub 3. The weld portion 5 is subjected to no big load, so that it is less likely to be damaged.

Figure 5:
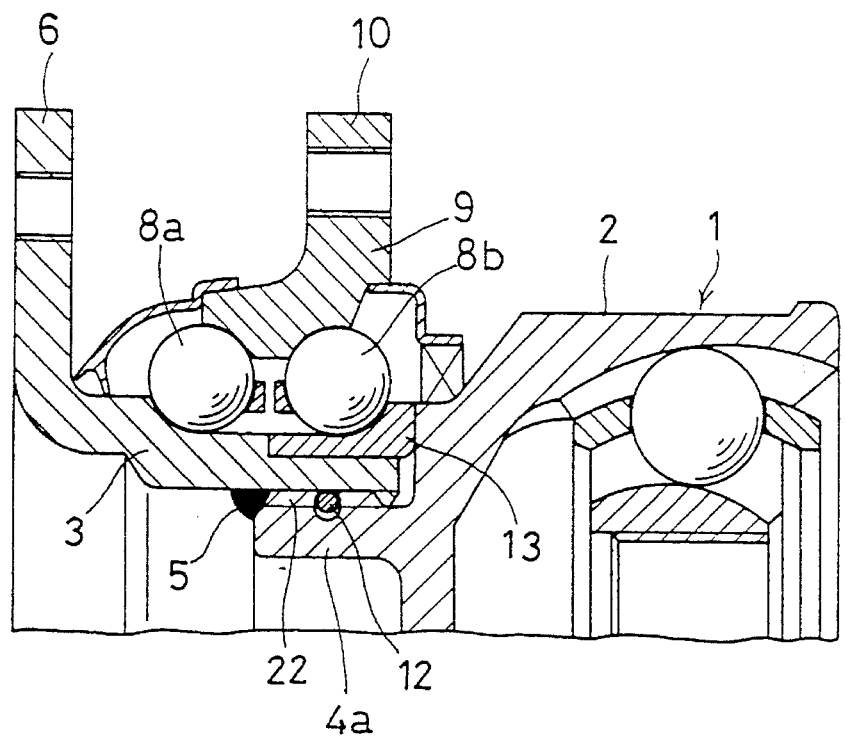

In the embodiment shown in FIG. 5, the shaft portion 4a of the outer ring 2 is shorter in axial length than the shaft portion 4 of the outer ring 2 shown in FIG. 2. Thus, the outer ring 2 is lighter in weight. Serrations 22 are formed on the joint surfaces of the shaft portion 4a and the hub 3 so as to mesh with each other with a certain interference.

As to its function and effect, this embodiment is the same as the embodiment shown in FIG. 4.

Figure 6:
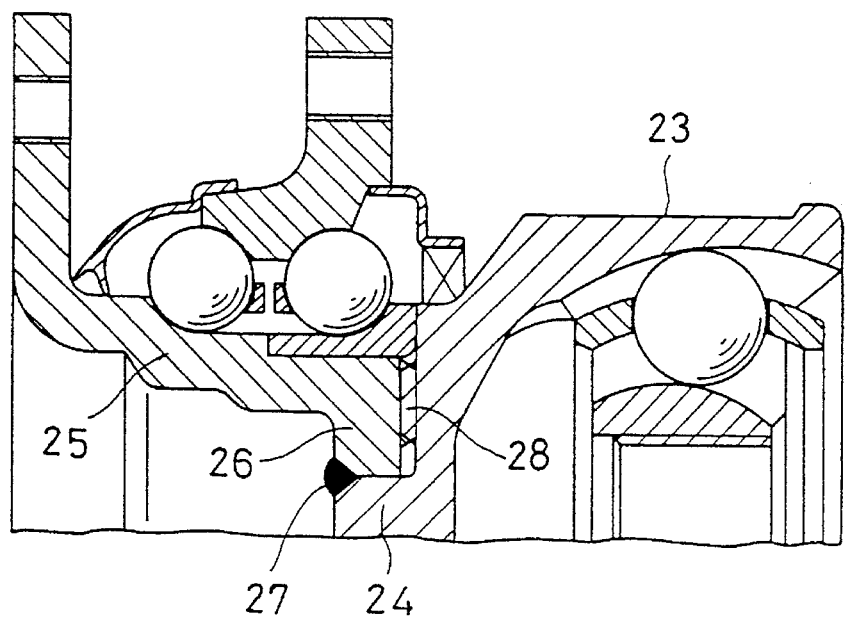
Figure 7:
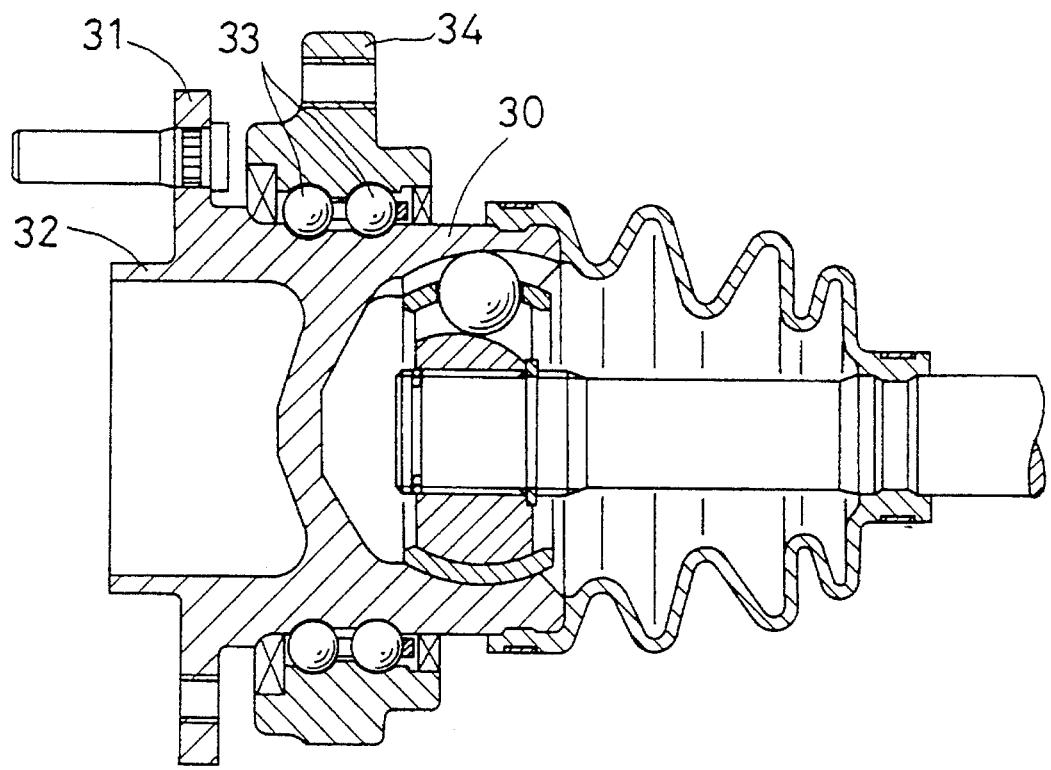
FIG. 7 is a sectional view of a conventional wheel bearing assembly.
Figure 8:
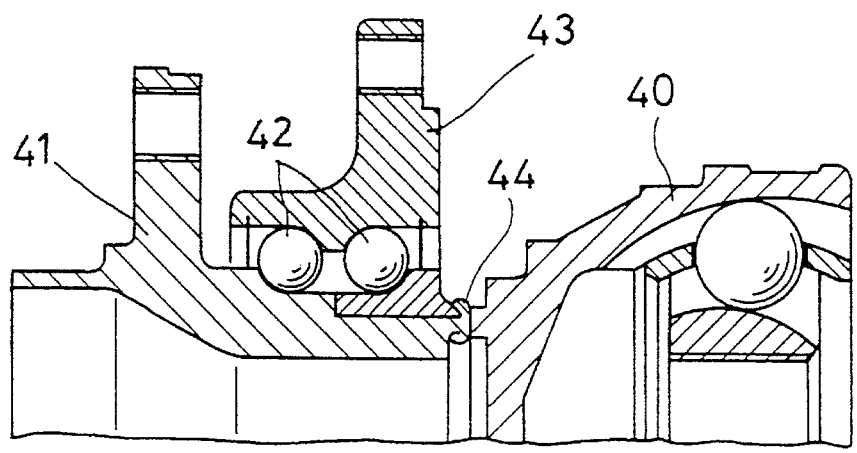
FIG. 8 is a sectional view of another conventional bearing assembly.

In the embodiment shown in FIG. 6, the outer ring 23 is provided with a protrusion 24 on its closed end, while the hub 25 has at its end an inwardly extending flange 26 press-fitted on the protrusion 24. The protrusion 24 and the hub 25 are welded together at 27 at one end of their joint area.

Also, radial teeth 28 are formed on the closed end of the outer ring 23 and the opposite surface of the flange 26 opposite the closed end so as to mesh with each other.

Otherwise, this embodiment is the same as the embodiment shown in FIG. 3. Thus, we denote like elements by like numerals and omit their description.

Its effects are also the same as the embodiment of FIG. 3. Torque is transmitted from the outer ring 23 to the hub 25 through the teeth 28. Thus, the weld portion 27 is free of load and thus less likely to be damaged.

In the embodiments of FIGS. 1 to 6, the joint surface between the outer ring 2 (14, 23) and the hub 3 (16, 25) has the shape of a cylinder having a central axis coincident with the common axis of the outer ring and the hub. But such a cylindrical joint surface may be offset from the axis of the outer ring and the hub.

Also, such a joint surface may have the shape of a polygon or an oval.

As described above, according to the present invention, the bearing outer ring can be mounted before joining the outer ring and the hub together. This makes it possible to reduce the size of the entire wheel bearing assembly. Since the outer ring and the hub are press-fitted together, the balls remain pre-loaded even after removing the press-fitting force. Thus, the outer ring and the hub can be easily welded together at their joint area, so that the bearing assembly can be assembled easily.

After press-fitting the outer ring and the hub together, they are welded together at one end of their joint area. The outer ring and the hub are thus coupled together extremely rigidly. Also, since torque is transmitted between the outer ring and the hub through the joint area, the weld portion is kept substantially load-free, so that the weld portion is less likely to be damaged. This makes it possible to weld the outer ring and the hub using a method that produces less heat.

In the arrangement in which serrations are formed on the joint surfaces of the outer ring and the hub, torque is transmitted between the outer ring and the hub through the serrations, so that it is possible to further reduce the possibility of damage of the weld portion.

By providing a retaining ring between the joint surfaces of the outer ring and the hub, this ring serves to prevent axial relative movement of the outer ring and the hub even if the weld portion should break. They can be thus joined together more reliably.

What is claimed is:

1. A vehicle wheel bearing assembly comprising an outer ring of a homokinetic joint, a hub coupled to a driven wheel and connected to one end of said outer ring to form a rotary member, and a bearing outer ring supported on said rotary member through balls arranged in a plurality of rows, said balls being pre-loaded when said outer ring and said hub are moved axially relative to each other, said outer ring and said hub being press-fitted together with interference, and said outer ring and said hub being welded together at one end of their joint area.

2. A vehicle wheel bearing assembly as claimed in claim 1, wherein serrations are formed on joint surfaces of said outer ring and said hub so as to be press-fitted together.

3. A vehicle wheel bearing assembly as claimed in claim 2, wherein a retaining ring is provided between joint surfaces of said outer ring and said hub.

4. A vehicle wheel bearing assembly as claimed in claim 1 wherein a retaining ring is provided between joint surfaces of said outer ring and said hub.

* * * * *